(12) United States Patent
Du et al.

(10) Patent No.: US 12,057,693 B2
(45) Date of Patent: Aug. 6, 2024

(54) HYBRID CIRCUIT BREAKER, HYBRID CIRCUIT BREAKING SYSTEM, AND CIRCUIT BREAKING METHOD

(71) Applicant: Siemens Aktiengesellschaft, Munich (DE)

(72) Inventors: Feng Du, Shanghai (CN); Wei Gang Chen, Shanghai (CN)

(73) Assignee: Siemens Aktiengesellschaft, Munich (DE)

( * ) Notice: Subject to any disclaimer, the term of this patent is extended or adjusted under 35 U.S.C. 154(b) by 381 days.

(21) Appl. No.: 17/598,416

(22) PCT Filed: Mar. 29, 2019

(86) PCT No.: PCT/CN2019/080553
§ 371 (c)(1),
(2) Date: Sep. 27, 2021

(87) PCT Pub. No.: WO2020/198985
PCT Pub. Date: Oct. 8, 2020

(65) Prior Publication Data
US 2022/0166205 A1 May 26, 2022

(51) Int. Cl.
*H02H 3/033* (2006.01)
*H02H 1/00* (2006.01)
*H02H 3/08* (2006.01)

(52) U.S. Cl.
CPC .......... *H02H 3/033* (2013.01); *H02H 1/0007* (2013.01); *H02H 1/0092* (2013.01); *H02H 3/08* (2013.01)

(58) Field of Classification Search
CPC ........ H01H 3/0213; H01H 3/60; H01H 33/59; H01H 33/596; H01H 33/66; H01H 33/666;
(Continued)

(56) References Cited

U.S. PATENT DOCUMENTS 9,692,225 B2 * 6/2017 Wu ........................ H02H 3/087
11,424,093 B2 * 8/2022 Steurer ................ H01H 3/0213
(Continued)

FOREIGN PATENT DOCUMENTS

CN 102696087 A 9/2012
CN 103280763 A 9/2013
(Continued)

OTHER PUBLICATIONS

PCT International Search Report and Written Opinion of International Searching Authority mailed Jan. 6, 2020 corresponding to PCT International Application No. PCT/CN/2019/080553 filed Mar. 29, 2019.

*Primary Examiner* — Tuan T Dinh
(74) *Attorney, Agent, or Firm* — Harness, Dickey & Pierce, P.L.C.

(57) ABSTRACT

A hybrid circuit breaker includes a semiconductor circuit breaker, connected between a first output end of a converter of a power supply or a source branch and a first end of a damping module; a first mechanical circuit breaker, connected in parallel to the semiconductor circuit breaker, an energy absorber, connected in parallel to the semiconductor circuit breaker, and a controller coupled to the semiconductor circuit breaker and the first mechanical circuit breaker, and when a current flowing through the converter is greater than a safe current, the controller is configured to control the first mechanical circuit breaker to be disconnected, and control the semiconductor circuit breaker to be closed.

13 Claims, 5 Drawing Sheets

(58) Field of Classification Search
CPC ........... H01H 9/02; H01H 9/54; H01H 9/954; H02H 9/00; H02H 9/02; H02H 9/04
USPC .................. 361/8, 102, 54, 87, 113–115
See application file for complete search history.

(56) References Cited

U.S. PATENT DOCUMENTS

| | | | |
|---|---|---|---|
| 2009/0201617 A1* | 8/2009 | Yamaguchi | H01H 9/40 361/93.9 |
| 2012/0218676 A1* | 8/2012 | Demetriades | H01H 9/542 361/115 |
| 2013/0021708 A1 | 1/2013 | Demetriades et al. | |
| 2013/0301180 A1* | 11/2013 | Crane | H01H 33/596 361/115 |
| 2014/0078622 A1 | 3/2014 | Crane | |
| 2014/0321013 A1* | 10/2014 | Drake | H01H 33/285 361/78 |
| 2015/0022928 A1* | 1/2015 | Mohaddes Khorassani | H02H 3/08 361/93.7 |
| 2015/0029621 A1* | 1/2015 | Giannoccaro | H02H 9/04 361/54 |
| 2015/0222111 A1* | 8/2015 | Magnusson | H01H 9/541 361/91.5 |
| 2017/0098520 A1* | 4/2017 | Mittelstadt | G01D 5/145 |

FOREIGN PATENT DOCUMENTS

| | | |
|---|---|---|
| CN | 104620345 A | 5/2015 |
| CN | 105281289 A | 1/2016 |
| CN | 106300237 A | 1/2017 |
| CN | 107086541 A | 8/2017 |
| CN | 107276045 A | 10/2017 |
| EP | 3057117 A1 | 8/2016 |

* cited by examiner

HYBRID CIRCUIT BREAKER, HYBRID CIRCUIT BREAKING SYSTEM, AND CIRCUIT BREAKING METHOD

PRIORITY STATEMENT

This application is the national phase under 35 U.S.C. § 371 of PCT International Application No. PCT/CN2019/080553 which has an International filing date of Mar. 29, 2019, which designated the United States of America, the entire contents of which are hereby incorporated herein by reference.

TECHNICAL FIELD

At least some example embodiments relate to the field of circuit breakers such as hybrid circuit breakers.

RELATED ART

Now, solid state circuit breakers (SSCBs) have been increasingly widely applied. An SSCB is formed by semiconductors, and has advantages of fast breaking, long contact life, and high intelligence, and therefore has a high application potential in the low-voltage protection field. However, if a large fault current occurs in a source branch having a converter, a semiconductor rectifier diode in the converter may be damaged.

Figure 1:
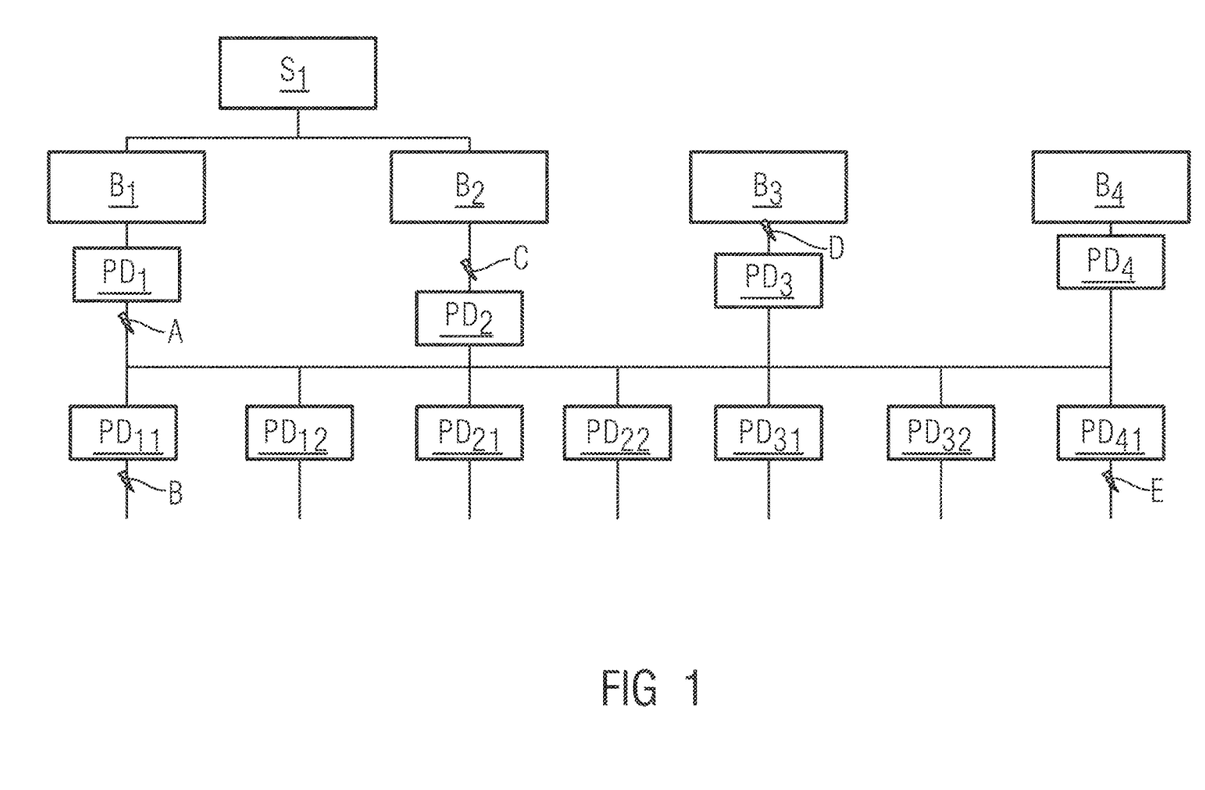
FIG. 1 is a schematic structural diagram of a DC power system.

A DC power system shown in FIG. 1 includes an AC power supply S1, where an AC power supply S2 supplies power to two source branches B1 and B2 connected in parallel, and the source branches B1 and B2 respectively have an AC/DC converter. Specifically, the source branches B1 and B2 are further respectively connected in series to a protection apparatus PD1 and a protection apparatus PD2, where a first parallel branch, a second parallel branch, a third parallel branch, and a fourth parallel branch are further exist under the protection apparatuses PD1 and PD2. The first parallel branch has a protection apparatus PD11, the second parallel branch has a protection apparatus PD12, the third parallel branch has a protection apparatus PD21, and the fourth parallel branch has a protection apparatus PD22. The DC power system further includes a battery source B3 and a PV power supply B4, where the battery source B3 and the PV power supply B4 are further respectively connected in series to a protection apparatus PD3 and a protection apparatus PD4. A fifth parallel branch, a sixth parallel branch, and a seventh parallel branch further exist under the protection apparatuses PD3 and PD4. The fifth parallel branch is connected in series to a protection apparatus PD31, the sixth parallel branch is connected in series to a protection apparatus PD32, and the seventh parallel branch is connected in series to a protection apparatus PD41.

As shown in FIG. 1, when a failure occurs in nodes A, B, C, D, and E, a fault current flows through a free-wheeling diode (free-wheeling diode) of a converter at an active front-end (AFE), and the rectifier diode in the converter may be damaged. Therefore, to disconnect the current before the fault current reaches a breakdown current of the diode, the protection apparatus has a fast reaction speed. However, a rated current of the source branch is relatively large. Therefore, if the SSCB is applied, the costs are excessively high.

Figure 2:
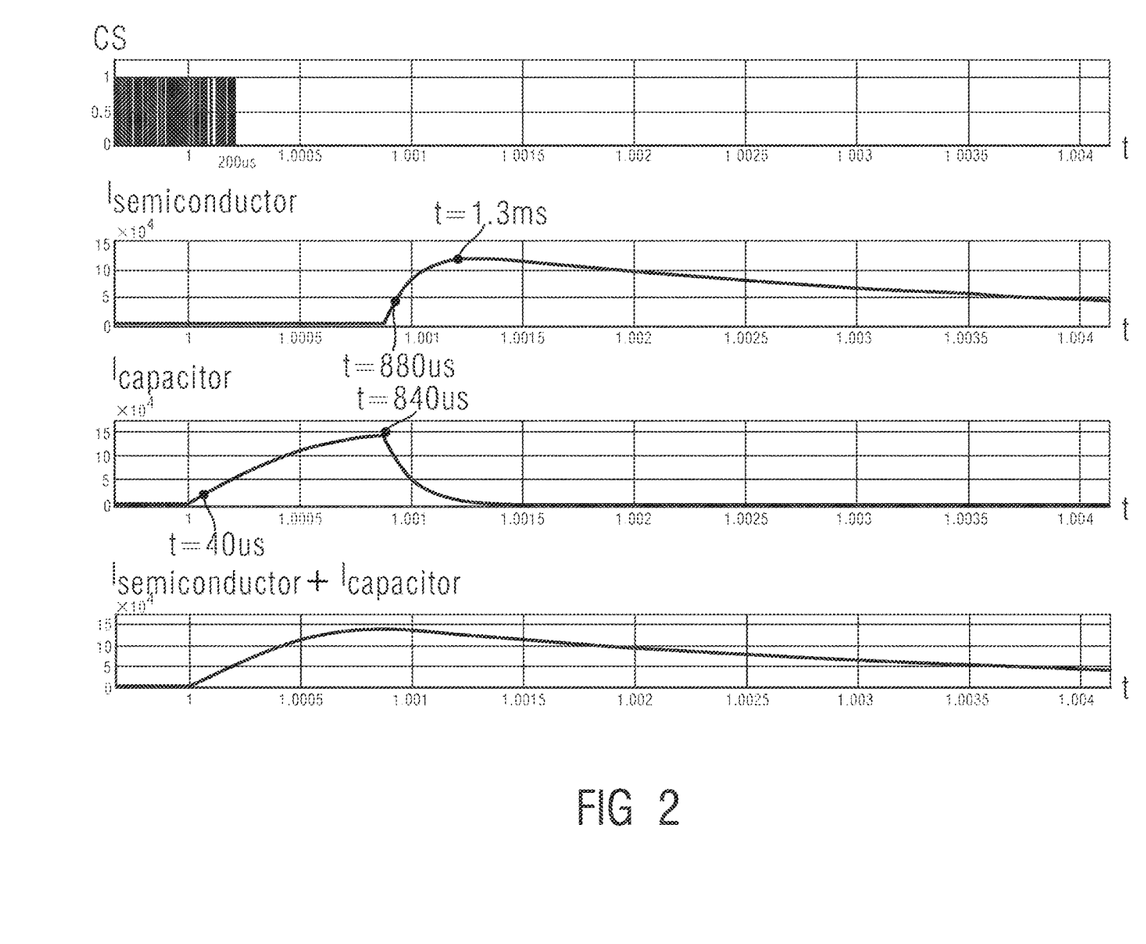
FIG. 2 is a simulation curve diagram of a DC power system when a failure occurs in node A.

For example, when a failure occurs in node A, it is assumed that a fault resistance Rfault=0.00001Ω, and the protection apparatus PD1 is an electric mechanical circuit breaker (EMCB). As shown in FIG. 2, the horizontal coordinate is time t, the vertical coordinate CS is a pulse control signal, the vertical coordinate Isemiconductor is a current flowing through a semiconductor rectifier diode in a converter of the source branch B1, the vertical coordinate Icapacitor is a current flowing through a straight-line bus voltage of the converter, and the vertical coordinate Isc is a current flowing through the protection apparatus PD1, where the current flowing through the protection apparatus PD1 is the sum of Isemiconductor and Icapacitor. The pulse control signal CS is a control signal of an AC/DC converter of the source branch B1, and skips between 0 and 1 according to a certain frequency. As shown in FIG. 2, after the failure occurs, when time t=200 μs, the pulse control signal CS is completely disconnected. When time t<880 μs, Isemiconductor<5In=3460 A, and when t=1.3 ms, Isemiconductor reaches a current peak, the current peak is close to 122 KA, and the device may be damaged. When t=40 μs, Icapacitor>10 KA, and when t=840 μs, Icapacitor reaches the current peak, and the current peak is close to 150 KA. When the EMCB is applied, if the fault current is not interrupted in 1 ms, the AFE has a relatively high risk. That is, the conventional circuit breaker has a slow speed, and is already large enough before disconnecting the fault current.

Therefore, neither the SSCB nor the EMCB in this case can be applied to a source branch having a converter or an active circuit.

SUMMARY

At least one example embodiment provides a hybrid circuit breaker, including a semiconductor circuit breaker connected between a first output end of a converter of a power supply or a source branch and a first end of a damping module; a first mechanical circuit breaker, connected in parallel to the semiconductor circuit breaker; an energy absorber, connected in parallel to the semiconductor circuit breaker; and a controller coupled to the semiconductor circuit breaker and the first mechanical circuit breaker, and when a current flowing through the converter is greater than a safe current, the controller is configured to control the first mechanical circuit breaker to be disconnected, and control the semiconductor circuit breaker to be closed.

Further, the hybrid circuit breaker further includes a protection apparatus, where a first input end of the protection apparatus is connected to a second end of the damping module, and a second input end of the protection apparatus is coupled to a second output end of the converter.

Further, the converter includes a capacitor, where the capacitor is connected between a second output end of the converter and the damping module, a first connection point is between the first mechanical circuit breaker and the damping module, and a first current sensor is connected between the first connection point and the capacitor, where when the first current sensor senses that a discharge current of the capacitor is greater than a threshold, the controller is configured to determine that the current flowing through the converter is greater than the safe current.

Further, the hybrid circuit breaker further includes a circuit breaker, where a first connection point is between the first mechanical circuit breaker and the damping module, the circuit breaker is connected between a first connection point and the second output end of the converter, and a first current sensor is connected between the first mechanical circuit breaker and the first connection point, where when the first current sensor senses a fault current greater than a threshold, the controller is configured to determine that the current flowing through the converter is greater than the safe current.

Further, the circuit breaker includes one of the following a second mechanical circuit breaker; a diode, where a positive electrode of the diode is coupled to a second output end of the power supply or the source branch, and a negative electrode of the diode is connected to the first connection point; and a semiconductor rectifier circuit.

At least one example embodiment provides a circuit breaking method, where the circuit breaking method is performed by the hybrid circuit breaker according to example embodiments, and the circuit breaking method includes controlling the first mechanical circuit breaker to be disconnected, and control the semiconductor circuit breaker to be closed when the current flowing through the converter is greater than the safe current.

Further, the converter includes a capacitor, the capacitor is connected between the second output end of the converter and the damping module, a first connection point is between the first mechanical circuit breaker and the damping module, and a first current sensor is connected between the first connection point and the capacitor, where the circuit breaking method further includes: determining that the current flowing through the converter is greater than the safe current when the first current sensor senses that a discharge current of the capacitor is greater than a threshold.

Further, the hybrid circuit breaker further includes a circuit breaker, a first connection point is between the first mechanical circuit breaker and the damping module, the circuit breaker is connected between the first connection point and the second output end of the converter, and a fist current sensor is connected between the first mechanical circuit breaker and the first connection point, where the circuit breaking method further includes: determining that the current flowing through the converter is greater than its safe current when the fault current sensed by the first current sensor is greater than a threshold.

At least another example embodiment provides a hybrid circuit breaking system, the hybrid circuit breaker according to example embodiments, a processor, and a memory coupled to the processor, where the memory stores instructions, and when being executed by the processor, cause the hybrid circuit breaking system to control the first mechanical circuit breaker to be disconnected, and control the semiconductor circuit breaker to be closed when the current flowing through the converter is greater than the safe current.

Further, the converter includes a capacitor, the capacitor is connected between the second output end of the converter and the damping module, a first connection point is between the first mechanical circuit breaker and the damping module, and a first current sensor is connected between the first connection point and the capacitor, where the processor, when executing the instructions, is configured to cause the hybrid circuit breaking system to determine that the current flowing through the converter is greater than the safe current when the first current sensor senses that a discharge current of the capacitor is greater than a threshold.

Further, the hybrid circuit breaker further includes a circuit breaker, a first connection point is between the first mechanical circuit breaker and the damping module, the circuit breaker is connected between the first connection point and the second output end of the converter, and a first current sensor is connected between the first mechanical circuit breaker and the first connection point, wherein the processor, when executing the instructions, is configured to cause the hybrid circuit breaking system to determine that the current flowing through the converter is greater than the safe current when a fault current sensed by the first current sensor is greater than a threshold.

In the hybrid circuit breaker provided in example embodiments, a fault current can be interrupted before reaching a safe threshold, and the hybrid circuit breaker provided in example embodiments has lower manufacturing costs than an SSCB.

DETAILED DESCRIPTION

The following describes at least some example embodiments with reference to the accompanying drawings.

To resolve/reduce the foregoing problem, at least one example embodiment provides a hybrid circuit breaker, including a semiconductor circuit breaker, a first mechanical circuit breaker, an energy absorber, and a control apparatus. Specifically, the semiconductor circuit breaker is connected between a first output end of a converter of a power supply or a source branch and a damping module, the first mechanical circuit breaker is connected in parallel to the semiconductor circuit breaker, and the energy absorber is connected in parallel to the semiconductor circuit breaker. The control apparatus is coupled to the semiconductor circuit breaker, where when a current flowing through the converter is greater than its safe current, the control apparatus controls the first mechanical circuit breaker to be disconnected, and controls the semiconductor circuit breaker to be closed.

Figure 3:
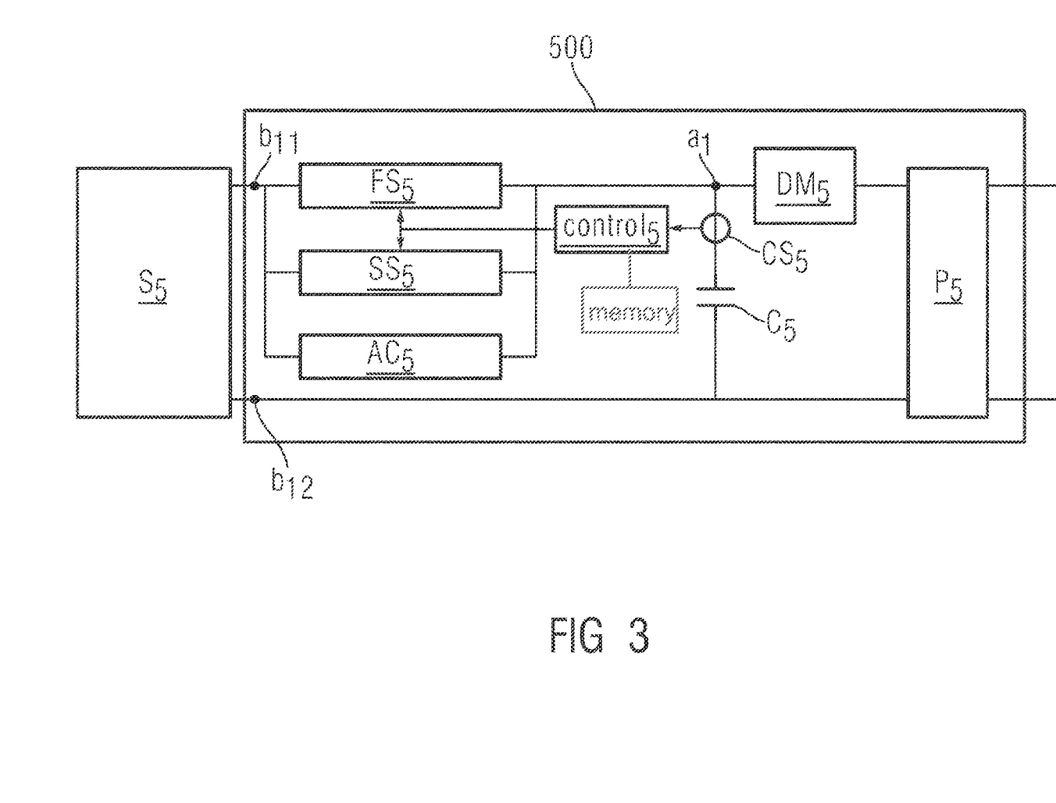
FIG. 3 is a schematic circuit connection diagram of a hybrid circuit breaker according to an example embodiment.

FIG. 3 is a schematic circuit connection diagram of a hybrid circuit breaker according to an example embodiment. As shown in FIG. 3, the hybrid circuit breaker is applied to a DC power system having a power supply S5 of a semiconductor, where the power supply S5 is optionally an AC power supply, a battery source, a PV power supply, or the like, and the semiconductor includes a rectifier diode or a free-wheeling diode in the converter. The power supply S5 is an AFE. In the example shown in FIG. 3, the hybrid circuit breaker uses a capacitor C5 in a converter of the power supply S5. Specifically, the protection apparatus 500 in FIG. 3 includes a semiconductor circuit breaker SS5, a first mechanical circuit breaker FS5, an energy absorber AC5, and a control apparatus control 5. Specifically, the semiconductor circuit breaker SS5 is connected between a first output end b11 of the converter of the power supply S5 and a damping module DM5, the first mechanical circuit breaker FS5 is connected in parallel to the semiconductor circuit breaker SS5, and the energy absorber AC5 is connected in parallel to the semiconductor circuit breaker SS5. The control apparatus control 5 is coupled to the semiconductor circuit breaker SS5 and the first mechanical circuit breaker FS5, where when a current flowing through the converter is greater than its safe current, the control apparatus control 5 controls the first mechanical circuit breaker FS5 to be disconnected, and controls the semiconductor circuit breaker SS5 to be closed. The protection apparatus 500 further includes a protection apparatus P5, and particularly, an EMCB. A first input end of the protection apparatus P5 is connected to the other end of the damping module DM5, and a second input end of the protection apparatus P5 is coupled to a second output end b12 of the converter of the power supply S5. The protection apparatus P5 is configured to prevent a semiconductor in the power supply S5 from generating a leakage current. An output end of the protection apparatus P5 is connected to a load.

In an application scenario in which the fault current is interrupted, a consideration is how to protect an SSCB itself. That is, after the operation of performing failure interruption is triggered, energy stored in a circuit should be released along a release path. The energy absorber AC5 is configured to provide an energy release path.

Specifically, as shown in FIG. 3, the converter of the power supply S5 includes a capacitor C5, the capacitor C5 is connected between the second output end b12 of the converter and the damping module DM5. A first connection point a1 exists between the first mechanical circuit breaker FS5 and the damping module DM5, and a first current sensor CS5 is further connected between the first connection point a1 and the capacitor C5. When the first current sensor CS5 senses that a discharge current of the capacitor C5 is greater than its threshold C5, it is determined that the current flowing through the converter is greater than its safe current, and the control apparatus control 5 controls the first mechanical circuit breaker FS5 to be disconnected, and controls the semiconductor circuit breaker SS5 to be closed.

In this embodiment, the discharge current of the capacitor C5 is regarded as a predictive current indicating whether a fault current can burn a diode of the converter. In a normal case, the first mechanical circuit breaker FS5 is closed, and the semiconductor circuit breaker SS5 is disconnected. The disconnection or closing of the first mechanical circuit breaker FS5 and the semiconductor circuit breaker SS5 is mainly based on a current flowing through a DC side capacitor, that is, the sum of currents respectively flowing through the capacitor C5 and the converter. Particularly, the current sensor CS5 is an AC sensor. Specifically, the fault current is from the power supply S5 to the fault position, that is, a load flow from the first output end b11 of the power supply S5 to the output end of the protection apparatus P5, and the discharge current of the capacitor C5 is used as the predictive current of the converter. Once the discharge current of the capacitor C5 is greater than its threshold, it means that the current flowing through the converter may exceed its safe threshold in the future several milliseconds (ms). Therefore, the control apparatus control 5 controls the first mechanical circuit breaker FS5 to be disconnected immediately, and controls the semiconductor circuit breaker SS5 to be closed immediately, to bypass the fault current. That is, the fault current is guided from an original path in the direction from the power supply S5 to the first mechanical circuit breaker FS5 to the direction from the power supply S5 to the semiconductor circuit breaker SS5.

The minimum disconnected time of the first mechanical circuit breaker FS5 is 500 μs.

In this embodiment, when the current flowing through the converter is normal, the first mechanical circuit breaker FS5 is closed. Once the current flowing through the converter exceeds a safe rated value, the first mechanical circuit breaker FS5 is disconnected. Accordingly, at least some example embodiments provide an easier design and do not use other isolated mechanical switches. The control apparatus control 5 is completely based on an analog circuit.

Figure 4:
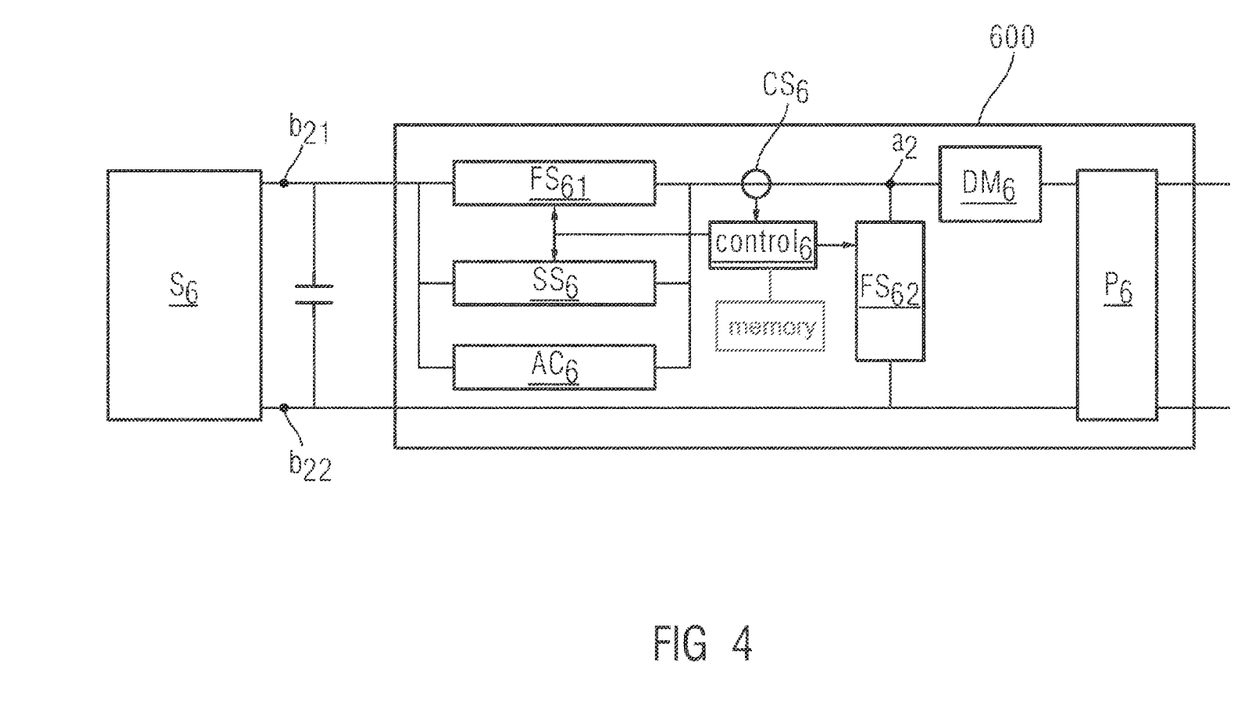
FIG. 4 is a schematic circuit connection diagram of a hybrid circuit breaker according to another example embodiment.

FIG. 4 is a schematic circuit connection diagram of a hybrid circuit breaker according to another example embodiment. As shown in FIG. 4, the hybrid circuit breaker is applied to a DC power system having a power supply S6 of a semiconductor, where the power supply S6 is optionally an AC power supply, a battery source, a PV power supply, or the like, and the semiconductor includes a rectifier diode or a free-wheeling diode in a converter. The power supply S6 is an AFE. Different from the foregoing embodiment, the hybrid circuit breaker provided in this embodiment does use the capacitor C5 in the converter of the power supply S6. Specifically, the protection apparatus 600 in FIG. 4 includes a semiconductor circuit breaker SS6, a first mechanical circuit breaker FS61, an energy absorber AC6, a control apparatus control 6, and a second mechanical circuit breaker FS62. Specifically, the semiconductor circuit breaker SS6 is connected between a first output end b21 of the converter of the power supply S6 and a damping module DM6, the first mechanical circuit breaker FS61 is connected in parallel to the semiconductor circuit breaker SS6, and the energy absorber AC6 is connected in parallel to the semiconductor circuit breaker SS6. The control apparatus control 6 is coupled to the semiconductor circuit breaker SS6 and the first mechanical circuit breaker FS61, where when a current flowing through the converter is greater than its safe current, the control apparatus control 6 controls the first mechanical circuit breaker FS61 to be disconnected, and controls the semiconductor circuit breaker SS6 to be closed. The hybrid circuit breaker further includes a second mechanical circuit breaker FS62, where a first connection point a2 exists between the first mechanical circuit breaker FS61 and the damping module DM6, the second mechanical circuit breaker FS62 is connected between the first connection point a2 and a second output end b22 of the converter. A second current sensor CS6 is further connected between the first mechanical circuit breaker FS61 and the first connection point a2. When a fault current sensed by the second current sensor CS6 is greater than its threshold, it is determined that the current flowing through the converter is greater than its safe current.

The protection apparatus 600 further includes a protection apparatus P6, and particularly, an EMCB. A first input end of the protection apparatus P6 is connected to the other end of the damping module DM6, and a second input end of the protection apparatus P6 is coupled to the second output end b22 of the converter of the power supply S6. The protection apparatus P6 is configured to prevent a semiconductor in the power supply S6 from generating a leakage current. An output end of the protection apparatus P6 is connected to a load.

In an application scenario in which the fault current is interrupted, a main problem is how to protect an SSCB itself. That is, after the operation of performing failure interruption is triggered, energy stored in a circuit should be released along a release path. The energy absorber AC6 is configured to provide an energy release path.

The first mechanical circuit breaker FS61 is parallel to the semiconductor circuit breaker SS6 and the energy absorber AC6, and serialized by using a source bus. The second mechanical circuit breaker FS62 is connected between a plus bus and a minus bus.

Particularly, the second mechanical circuit breaker FS62 may also be replaced with another circuit device that can perform its functions, for example, a diode. The diode is backward connected, that is, a positive electrode of the diode is coupled to a second output end of the power supply or the source branch, and a negative electrode of the diode is connected to the first connection point. Optionally, the second mechanical circuit breaker FS62 may also be replaced with a semiconductor rectifier circuit. The damping module DM6 has an inductance coefficient, and is serialized by using a source bus.

Specifically, in a case, the first mechanical circuit breaker FS61 is closed, and controls the semiconductor circuit breaker SS5 to be disconnected, and the second mechanical circuit breaker FS62 to be disconnected. When the fault current exceeds the safe value, the control apparatus control 6 determines a discharge current based on a control algorithm. Specifically, when the fault current exceeds its threshold, the control apparatus control 6 controls the second mechanical circuit breaker FS62 to be closed, where the control apparatus control 6 controls the second mechanical circuit breaker FS62 to be closed in 500 us. When the current falls back to a value range in which the current may be interrupted by disconnecting the first mechanical circuit breaker FS61, the entire system may be cut off by the first mechanical circuit breaker FS61, where the control apparatus control 6 controls the first mechanical circuit breaker FS61 to be closed in 1 ms. In addition, the semiconductor circuit breaker SS5 and the energy absorber AC6 parallel to the first mechanical circuit breaker FS61 are switched in a closed and disconnected state to complete correct current commutation.

Figure 5:
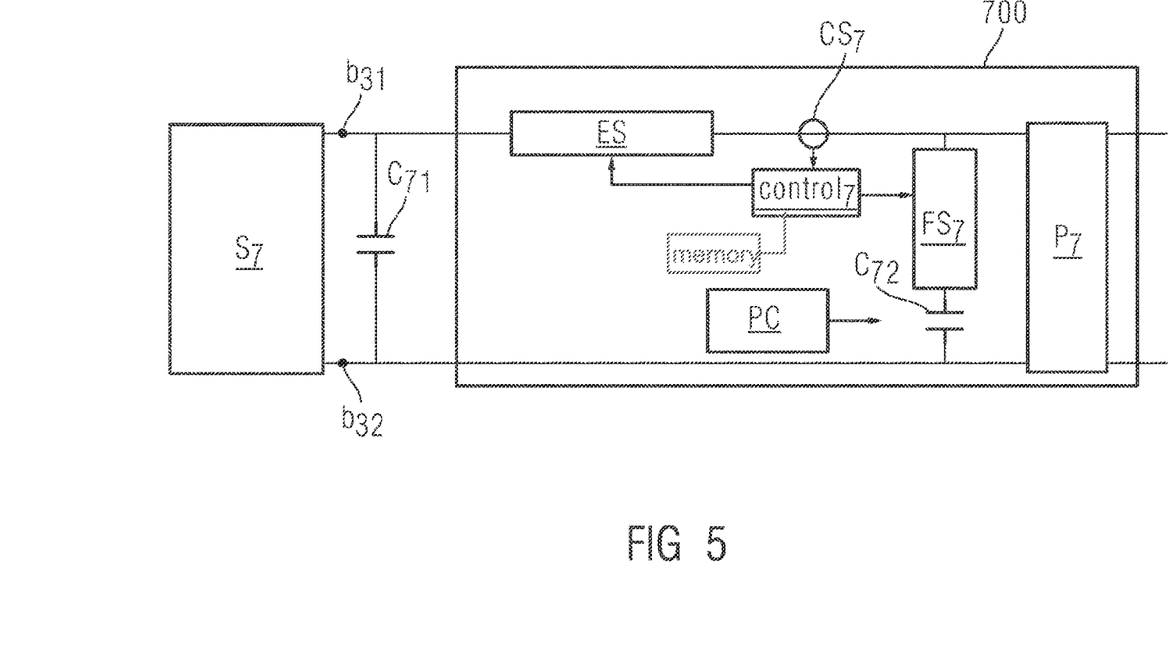
FIG. 5 is a schematic circuit connection diagram of a hybrid circuit breaker according to another example embodiment.

FIG. 5 is a schematic circuit connection diagram of a hybrid circuit breaker according to another example embodiment. As shown in FIG. 5, the hybrid circuit breaker is applied to a DC power system having a power supply S7 of a semiconductor, where the power supply S7 is optionally an AC power supply, a battery source, a PV power supply, or the like, and the semiconductor includes a rectifier diode or a free-wheeling diode in a converter. The power supply S7 is an AFE. Different from the foregoing embodiment, the hybrid circuit breaker provided in this embodiment uses an EMCB ES. Specifically, the protection apparatus 700 in FIG. 5 includes an EMCB ES, a mechanical circuit breaker FS7, a control apparatus control 7, a pump circuit PC, and a second capacitor C72. The protection apparatus 700 further includes a protection apparatus P7, and particularly, an EMCB. The protection apparatus P7 is configured to prevent a semiconductor in the power supply S7 from generating a leakage current. An output end of the protection apparatus P7 is connected to a load. The first capacitor C71 is a capacitor of the converter in the power supply S7, and is connected in parallel to the power supply S7.

Specifically, the EMCB ES is connected to a first output end b31 of the power supply S7, and the other end of the EMCB ES is connected to a current sensor CS7. A parallel branch exists between the first output end b31 and a second output end b32 of the power supply S7, and the parallel branch is formed by the mechanical circuit breaker FS7 and the second capacitor C72 connected in series. The control apparatus control 7 is respectively coupled to the EMCB ES and the mechanical circuit breaker FS7, and the control apparatus control 7 is driven by a signal of the current sensor CS7.

In an application scenario in which the fault current is interrupted, an issue is how to protect an SSCB. That is, after the operation of performing failure interruption is triggered, energy stored in a circuit should be released along a release path. The energy absorber AC7 is configured to provide an energy release path.

The closed time of the mechanical circuit breaker FS7 is 500 vs. Parameters of the second capacitor C72 can be adjusted according to an actual case, and the pump circuit PC is designed to adjust its initial voltage. The control apparatus control 7 controls a fast mechanical switch according to whether it is determined that a discharge current of the first capacitor C71 of the converter reaches a first threshold, and interrupts the entire system according to a second threshold.

At least one example embodiment provides a circuit breaking method, where the circuit breaking method is performed by the hybrid circuit breaker according to example embodiments, and the circuit breaking method includes the following step:

when the current flowing through the converter is greater than its safe current, triggering the control apparatus to control the first mechanical circuit breaker to be disconnected, and control the semiconductor circuit breaker to be closed.

Further, the converter includes a capacitor, where the capacitor is connected between a second output end of the converter and the damping module, a first connection point exists between the first mechanical circuit breaker and the damping module, and a first current sensor is further connected between the first connection point and the capacitor, where the circuit breaking method further includes the following step: when the first current sensor senses that a discharge current of the capacitor is greater than its threshold, determining that the current flowing through the converter is greater than its safe current.

Further, the hybrid circuit breaker further includes a circuit breaker, a first connection point exists between the first mechanical circuit breaker and the damping module, the circuit breaker is connected between the first connection point and a second output end of the converter, and a second current sensor is further connected between the first mechanical circuit breaker and the first connection point, where the circuit breaking method further includes the following step: when a fault current sensed by the second current sensor is greater than its threshold, determining that the current flowing through the converter is greater than its safe current.

At least one example embodiment provides a hybrid circuit breaking system, where the circuit breaking system includes the hybrid circuit breaker according to example embodiments, and the hybrid circuit breaking system includes: a processor; and a memory coupled to the processor, where the memory stores instructions, and when being executed by the processor, the instructions make the electronic device execute an action, and the action includes:

when the current flowing through the converter is greater than its safe current, triggering the control apparatus to control the first mechanical circuit breaker to be disconnected, and control the semiconductor circuit breaker to be closed.

Further, the converter includes a capacitor, the capacitor is connected between a second output end of the converter and the damping module, a first connection point exists between the first mechanical circuit breaker and the damping module, and a first current sensor is further connected between the first connection point and the capacitor, where the action further includes: when the first current sensor senses that a discharge current of the capacitor is greater than its threshold, determining that the current flowing through the converter is greater than its safe current.

Further, the hybrid circuit breaker further includes a circuit breaker, a first connection point exists between the first mechanical circuit breaker and the damping module, the circuit breaker is connected between the first connection point and a second output end of the converter, and a second current sensor is further connected between the first mechanical circuit breaker and the first connection point, where the action further includes: when a fault current sensed by the second current sensor is greater than its threshold, determining that the current flowing through the converter is greater than its safe current.

In the hybrid circuit breaker provided in example embodiments, a fault current can be interrupted before reaching a safe threshold, and the hybrid circuit breaker provided in example embodiments has lower manufacturing costs than an SSCB.

Although the content of at least some example embodiments has been described in detail with reference to the foregoing example embodiments, it should be recognized that the foregoing description shall not be regarded as a limitation example embodiments. After a person skilled in the art reads the foregoing content, modifications and replacements to example embodiments are obvious. Therefore, the protection scope of example embodiments shall be limited by the appended claims. In addition, any reference numbers in the claims shall not be regarded to limit the involved claims; the word "include" does not exclude the apparatuses or steps not listed in other claims or specifications; and the words "first" and "second" are only used to represent names, but do not represent any particular sequence.

What is claimed is:

1. A hybrid circuit breaker, comprising:
a semiconductor circuit breaker connected between a first output end of a converter of a power supply or a source branch and a first end of a damping module;
a first mechanical circuit breaker connected in parallel to the semiconductor circuit breaker;
an energy absorber connected in parallel to the semiconductor circuit breaker; and
a controller coupled to the semiconductor circuit breaker and the first mechanical circuit breaker, wherein when a current flowing through the converter is greater than a safe current, the controller is configured to control the first mechanical circuit breaker to be disconnected and control the semiconductor circuit breaker to be closed,
wherein the converter includes a capacitor connected between a second output end of the converter and the damping module, a first connection point is between the first mechanical circuit breaker and the damping module, and a first current sensor is connected between the first connection point and the capacitor, and
wherein when the controller is configured to determine that the current flowing through the converter is greater than the safe current based on the first current sensor sensing that a discharge current of the capacitor is greater than a threshold.

2. The hybrid circuit breaker according to claim 1, further comprising:
a protection apparatus, wherein a first input end of the protection apparatus is connected to a second end of the damping module and a second input end of the protection apparatus is coupled to a second output end of the converter.

3. A circuit breaking method, wherein the circuit breaking method is performed by the hybrid circuit breaker according to claim 1, and the circuit breaking method comprises:
controlling the first mechanical circuit breaker to be disconnected and the semiconductor circuit breaker to be closed when the current flowing through the converter is greater than the safe current.

4. A hybrid circuit breaking system comprising:
the hybrid circuit breaker according to claim 1; and
a memory coupled to the controller, wherein the memory stores instructions, when being executed by the controller, cause the hybrid circuit breaking system to,
control the first mechanical circuit breaker to be disconnected and control the semiconductor circuit breaker to be closed when the current flowing through the converter is greater than the safe current.

5. A circuit breaking method, wherein the circuit breaking method is performed by the hybrid circuit breaker according to claim 2, and the circuit breaking method comprises:
controlling the first mechanical circuit breaker to be disconnected and the semiconductor circuit breaker to be closed when the current flowing through the converter is greater than the safe current.

6. A hybrid circuit breaking system comprising:
the hybrid circuit breaker according to claim 2; and
a memory coupled to the controller, wherein the memory stores instructions, when being executed by the controller, cause the hybrid circuit breaking system to,
control the first mechanical circuit breaker to be disconnected and control the semiconductor circuit breaker to be closed when the current flowing through the converter is greater than the safe current.

7. A hybrid circuit breaker, comprising:
a semiconductor circuit breaker connected between a first output end of a converter of a power supply or a source branch and a first end of a damping module;
a first mechanical circuit breaker connected in parallel to the semiconductor circuit breaker;
an energy absorber connected in parallel to the semiconductor circuit breaker;
a controller coupled to the semiconductor circuit breaker and the first mechanical circuit breaker, wherein when a current flowing through the converter is greater than a safe current, the controller is configured to control the first mechanical circuit breaker to be disconnected and control the semiconductor circuit breaker to be closed;
a circuit breaker connected between a first connection point and a second output end of the converter; and
a first current sensor connected between the first mechanical circuit breaker and the first connection point,
wherein the controller is configured to determine that the current flowing through the converter is greater than the safe current in response to the first current sensor sensing a fault current greater than a threshold.

8. The hybrid circuit breaker according to claim 7, wherein the circuit breaker comprises one of:
a second mechanical circuit breaker;
a diode, wherein a positive electrode of the diode is coupled to a second output end of the power supply or the source branch, and a negative electrode of the diode is connected to the first connection point; or
a semiconductor rectifier circuit.

9. A circuit breaking method, wherein the circuit breaking method is performed by the hybrid circuit breaker according to claim 7, and the circuit breaking method comprises:
controlling the first mechanical circuit breaker to be disconnected and the semiconductor circuit breaker to be closed when the current flowing through the converter is greater than the safe current.

10. The hybrid circuit breaker according to claim 7, further comprising:
   a protection apparatus, wherein a first input end of the protection apparatus is connected to a second end of the damping module and a second input end of the protection apparatus is coupled to a second output end of the converter.

11. A hybrid circuit breaking system comprising:
   the hybrid circuit breaker according to claim 7; and
   a memory coupled to the controller, wherein the memory stores instructions, when being executed by the controller, cause the hybrid circuit breaking system to,
   control the first mechanical circuit breaker to be disconnected and control the semiconductor circuit breaker to be closed when the current flowing through the converter is greater than the safe current.

12. A circuit breaking method, wherein the circuit breaking method is performed by the hybrid circuit breaker according to claim 8, and the circuit breaking method comprises:
   controlling the first mechanical circuit breaker to be disconnected and the semiconductor circuit breaker to be closed when the current flowing through the converter is greater than the safe current.

13. A hybrid circuit breaking system comprising:
   the hybrid circuit breaker according to claim 8; and
   a memory coupled to the controller, wherein the memory stores instructions, when being executed by the controller, cause the hybrid circuit breaking system to,
   control the first mechanical circuit breaker to be disconnected and control the semiconductor circuit breaker to be closed when the current flowing through the converter is greater than the safe current.

* * * * *